United States Patent
Wakamatsu et al.

[15] 3,662,625
[45] May 16, 1972

[54] AUTOMATIC TRANSMISSION CONTROL SYSTEM ON AUTOMOBILES

[72] Inventors: Hisato Wakamatsu, Kariya; Akira Kitano, Nagoya; Hisasi Kawai, Toyohashi, all of Japan

[73] Assignee: Nippondenso Kabushiki Kaisha, Kariyashi, Aichi-ken, Japan

[22] Filed: May 7, 1970

[21] Appl. No.: 35,327

Related U.S. Application Data

[63] Continuation-in-part of Ser. No. 34,098, May 4, 1970.

[30] Foreign Application Priority Data

May 9, 1969 Japan..................................44/35864

[52] U.S. Cl..................................................74/866
[51] Int. Cl..................................................B60k 21/00
[58] Field of Search....................................74/866

[56] References Cited

UNITED STATES PATENTS

| | | |
|---|---|---|
| 3,068,715 | 12/1962 | Brennan et al.......................74/866 X |
| 3,122,940 | 3/1964 | Shimwell et al..........................74/866 |
| 3,267,762 | 8/1966 | Reval...................................74/866 X |
| 3,433,101 | 3/1969 | Scholl et al. ............................74/866 |
| 3,478,851 | 11/1969 | Smyth et al. .........................74/866 X |
| 3,448,640 | 6/1969 | Nelson....................................74/866 |

Primary Examiner—Arthur I. McKeon
Attorney—Cushman, Darby & Cushman

[57] ABSTRACT

An automatic transmission control system of automobiles, wherein the coupling of a gear of the multiposition shifting mechanism and a gear meshing therewith on the engine side is released when a speed change signal is sent out, thereby placing the gears in neutral for a predetermined time interval until the specified change gear is meshed by the fluid coupling with the engine side gear, so as to eliminate shocks otherwise experienced by the automobile at the time of gear shifting to prevent people on the automobile from feeling discomfort, as well as to reduce wear on the gear mesh clutches per car-mile.

5 Claims, 8 Drawing Figures

INVENTORS
HISATO WAKAMATSU
AKIRA KITANO
HISASI KAWAI

BY Cushman, Darby & Cushman
ATTORNEYS

AUTOMATIC TRANSMISSION CONTROL SYSTEM ON AUTOMOBILES

This application is a continuation-in-part of our copending application, Ser. No. 34,098, filed May 4, 1970.

This invention relates to improvements in the control system for the automatic transmissions an automobiles comprising a fluid type torque converter and a multi-position gear shift mechanism.

In the automatic transmission systems employed for usual automobiles, a four-position automatic transmission system for buses, for instance the transmission control specifies or selects a particular one of the first, second, third and fourth speed gears and the reverse gear in the multi-position shifting mechanism to be meshed with the engine side gear, in consistence with the shifting points predetermined from the output of a DC generator detecting the automobile speed and the output of a throttle switch indicating the degree of inclination of the accelerator pedal, or in dependence upon the automobile speed and load. For example, a signal to cause gear shift from the first speed gear into the second speed gear causes current to pass through the corresponding solenoid coil of an electromagnetic valve unit consisting of four electromagnetic valves each having a solenoid to open the electromagnetic valve having the energized solenoid. Compressed air enters through the open valve to actuate a clutch linked to the second speed gear so as to render the same into mesh with the engine side gear. At the same time, current through the solenoid associated with the first speed gear is cut off to close the first speed gear valve so as to release the first speed gear clutch, thus de-meshing the first speed gear from the engine side gear.

Actually, the second speed gear is coupled with the engine side gear before the first speed gear is completely uncoupled from the engine side gear, because of the facts that the time required to complete the coupling of the second speed gear and the engine side gear by opening the electromagnetic valve for the second speed gear to apply the second speed gear clutch is somewhat longer than the time required to complete the uncoupling of the first speed gear from the engine side gear by closing the electromagnetic valve for the first speed gear to release the first speed gear clutch due to a delay in releasing the compressed air, and that the fluid coupling is slow in the response characteristic. As a result, the automobile experiences an extreme shock causing the passengers to feel very uncomfortable. Also, wear of the gear mesh clutches is disadvantageously increased. These results are not limited to the gear shifting from the first into the second speed gears, but are also inevitable when shifting gears from the second into the third, from the third into the fourth, from the fourth into the third, from the third into the second and from the second into the first speed gears, that is at the shifting points.

An object of the invention is to provide an automatic transmission control system on automobiles comprising an electromagnetic valve drive circuit having speed change signals as the input to feed solenoids of an electromagnetic valve unit consisting of a plurality of electromagnetic valves each having a solenoid winding and timer circuits acting to cut current off all the solenoids of the electromagnetic valve unit for a period of time particular to each of the speed change signals every time a speed change signal enters one of the timer circuits.

According to the invention, it is possible to place the gears in neutral when a speed change signal is sent out by de-meshing the previously coupled gear of the multi-position shifting mechanism from the engine side gear for a predetermined period of time until the specified substitution gear is rendered into mesh with the engine side gear, giving the excellent effect of completely eliminating shocks otherwise resulting at the time of shifting gears thus preventing the passengers from feeling discomfort at that time, as well as extremely reducing wear on the gear mesh clutches.

The invention will now be described in conjunction with a preferred embodiment thereof with reference to the accompanying drawings, in which.

Figure 1:
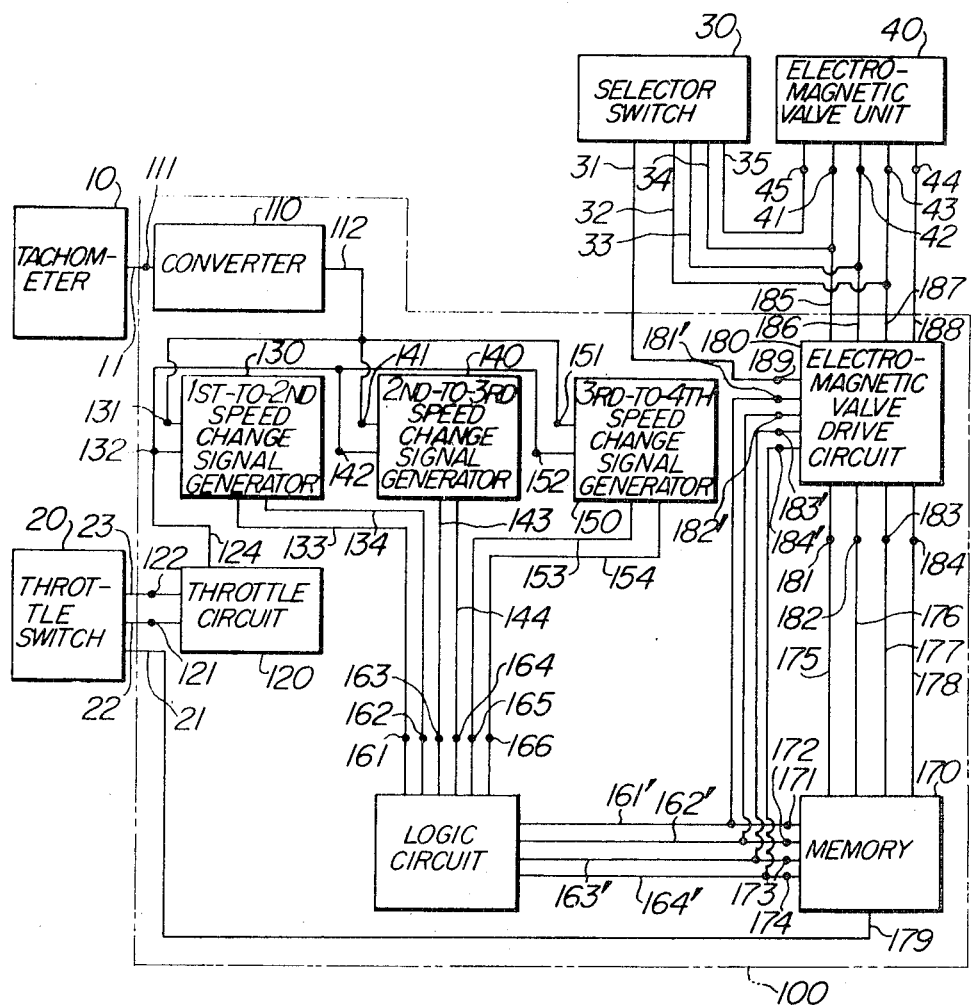
FIG. 1 is a block diagram of a preferred embodiment of the automatic transmission control system for automobiles according to the invention.

Referring now to FIG. 1, reference numeral 10 designates a tachometer detecting the automobile speed, 20 designates a throttle switch, 30 designates a selecter switch, and 40 designates an electromagnetic valve unit. Reference numeral 100 generally designates a speed change signal control circuit comprising an AC–DC converter 110, a throttle circuit 120, a first-to-second speed change signal generator 130 to generate a signal to cause gear shift from the first speed gear into the second speed gear, a second-to-third speed change generator 140 to generate a signal to cause gear shift from the second speed gear into the third speed gear, a third-to-fourth speed change signal generator 150 to generate a signal to cause gear shift from the third speed gear into the fourth speed gear, a logic circuit 160, a memory 170 and an electromagnetic valve drive circuit 180. The tachometer 10 has its output terminal 11 connected to an input terminal 111 of the AC–DC converter 110. The throttle switch 20 has output terminals 21, 22 and 23, one of which, namely output terminal 21, is connected to an input terminal 179 of the memory 170, while the other output terminals 22 and 23 are connected to respective input terminals 121 and 122 of the throttle circuit 120. The AC–DC converter 110 has its output terminal 112 connected to input terminals 131, 141 and 151 of the respective first-to-second, second-to-third and third-to-fourth speed change signal generators 130, 140 and 150. The throttle circuit 120 has its output terminal 124 connected to input terminals 132, 142 and 152 of the respective first-to-second, second-to-third and third-to-fourth speed change signal generators 130, 140 and 150. The first-to-second speed change signal generator 130 has output terminals 133 and 134 connected to respective input terminals 161 and 162 of the logic circuit 160. The second-to-third speed change signal generator 140 has output terminals 143 and 144 connected to respective input terminals 163 and 164 of the logic circuit 160. The third-to-fourth speed change signal generator 150 has output terminals 153 and 154 connected to respective input terminals 165 and 166 of the logic circuit 160. The logic circuit 160 has output terminals 161', 162', 163' and 164' connected to respective input terminals 171, 172, 173 and 174 of the memory 170, which has output terminals 175, 176, 177 and 178 connected to respective input terminals 181, 182, 183 and 184 of the electromagnetic valve drive circuit 180. The output terminals 161', 162', 163' and 164' of the logic circuit 160 are also connected to respective input terminals 181', 182', 183' and 184' of the electromagnetic valve drive circuit 180, which has output terminals 185, 186, 187 and 188 connected to respective input terminals 41, 42, 43 and 44 of the electromagnetic valve unit 40. The selecter switch 30 has output terminals 31, 32, 33, 34 and 35, one of which, namely the output terminal 31, is connected to an input terminal 189 of the electromagnetic valve drive circuit 180, while the other output terminals 32, 33, 34 and 35 are connected to respective input terminals 43, 42, 41 and 45 of the electromagnetic valve unit 40. It is to be understood that power supply and power supply circuit are omitted.

In the operation of various essential parts of the system of the illustrated circuit construction, the tachometer 10, which may be attached to a cable outlet provided in the vehicle or mounted within the gear means, generates output at frequencies proportional to the automobile speed at the output terminal 11. The AC–DC converter 110 converts the magnitude of the frequency of output from the tachometer 10 into a corresponding voltage output appearing at the output terminal 112.

Figure 2:
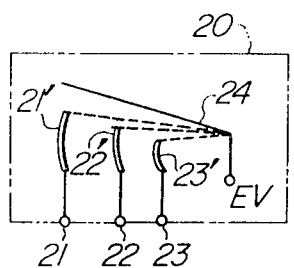
FIG. 2 shows a throttle switch in the system according to the invention.

The throttle switch 20 is a multi-state switch having a throttle contact 24 and fixed contacts 21', 22' and 23', as shown in FIG. 2. The fixed contacts 21', 22' and 23' are preset such that they are respectively closed as the throttle opening is progressively increased to "light," "normal" and "full" states, successively bringing the throttle contact 24 into contact with the fixed contacts 21', 22' and 23' when the accelerator pedal continues to be depressed. Thus, when the throttle opening is "full," the throttle contact 24 touches all the fixed contacts 21', 22' and 23'. To the throttle contact 24 is applied a constant voltage $E_V$.

Figure 3:
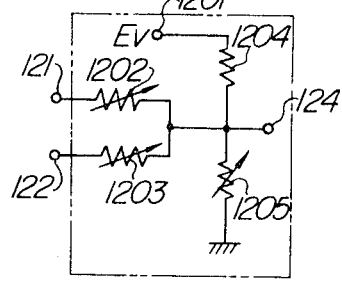
FIG. 3 is a circuit diagram of a throttle circuit in the system according to the invention.

As shown in FIG. 3, the voltage $E_V$ may be applied to a terminal 1201 of the throttle circuit 120, which includes a variable resistor 1202 inserted between the input and output terminals 121 and 124, a variable resistor 1203 inserted between the input and output terminals 122 and 124, a resistor 1204 inserted between the terminal 1201 and the output terminal 124 and a grounded variable resistor 1205 connected to the output terminal 124. In the operation of the throttle circuit 120 of the above construction, when a signal ($E_V$) is not impressed upon the input terminals 121 and 122, the voltage $E_1$ at the output terminal 124 is $$E_1 = \frac{R_1}{R + R_1} E_V \quad (1)$$

where R is the resistance of the resistor 1204 and $R_1$ is the resistance of the variable resistor 1205. When the throttle switch 20 is switched, as the accelerator pedal is being depressed, over to the "normal" state, a signal ($E_V$) appears at the input terminal 121, and a corresponding voltage $E_2$ at the output terminal 124 becomes $$E_2 = \frac{R_1}{R_1 + R \parallel R_2} E_V \quad (2)$$

wherein $R_2$ is the resistance of the variable resistor 1202. As the accelerator pedal is full depressed, the throttle switch 20 is switched into the "full" state, causing a signal ($E_V$) to appear at both the input terminals 121 and 122. The voltage $E_3$ at the output terminal 124 this time is given as $$E_3 = \frac{R_1}{R_1 + R \parallel R_2 \parallel R_3} E_V \quad (3)$$

where $R_3$ is the resistance of the variable resistor 1203. As is seen, the voltage at the output terminal 124 assumes successive values $E_1$, $E_2$ and $E_3$ in correspondence with the successively changing "light," "normal" and "full" states of the throttle switch 20.

Figure 4:
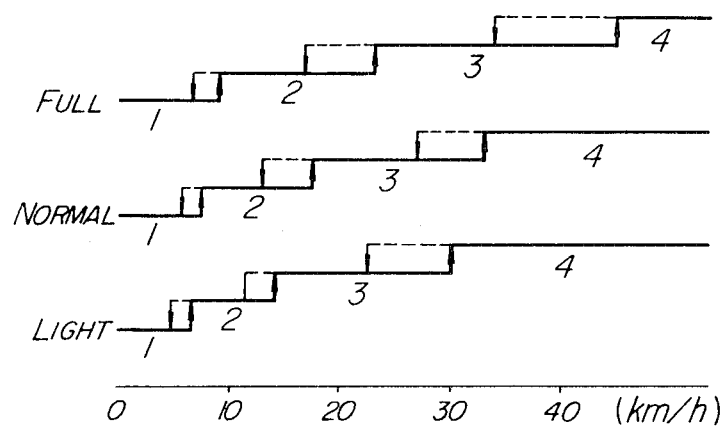
FIG. 4 shows the transmission characteristics of the system according to the invention.

The parameters of the first-to-second, second-to-third and third-to-fourth speed change signal generators 130, 140 and 150, which compare a signal (voltage) at the output terminal 112 of the AC–DC converter 110 and proportional to the automobile speed and a signal (voltage) from the throttle circuit 120 and indicating the throttle state, are preset such that the transmission characteristics (except for the idling situation) as shown in FIG. 4 may be obtained. In FIG. 4, the abscissa represents the automobile speed (in km/h) and the ordinate represents the "light," "normal" and "full" states of the throttle switch 20. The arrows directed from line segments 1 to line segments 2 and vice versa, from line segments 2 to line segments 3 and vice versa and line segments 3 to line segments 4 and vice versa correspond to the respective shifting points, at which the gear shift should be made from the first into the second speed gears and vice versa, from the second into the third speed gears and vice versa and from the third into the fourth speed gears and vice versa respectively. The first-to-second, second-to-third and third-to-fourth speed change signal generators 130, 140 and 150 take respective roles of causing gear shift from the first into the second speed gears and vice versa, causing gear shift from the second into the third speed gears and vice versa and causing gear shift from the third into the fourth speed gears and vice versa, they each comprise a comparing circuit, a feed-back circuit and a phase invecter.

When a point for the gear shift from the first into the second is reached, the output terminal 133 of the first-to-second speed change signal generator 130 does not offer output voltage (hereinafter symbolized as 0), but the other output terminal 134 provides output voltage (hereinafter symbolized as 1). Conversely, when a point for the gear shift from the second into the first is reached, the output terminal 133 is 1, while the output terminal 134 is 0. Similarly, at the second-to-third shifting point, the second-to-third speed change signal generator 140 has the output terminal 143 being 0 and the other output terminal 144 being 1, and conversely at the third-to-second speed change point it has the output terminals 143 and 144 respectively being 0 and 1. At this time the first-to-second speed change signal generator 130 naturally has its output terminals 133 and 134 respectively being 0 and 1. Likewise, at the third-to-fourth speed change point the third-to-fourth speed change signal generator 150 has its output terminals 153 and 154 respectively being 0 and 1, and conversely at the fourth-to-third speed change point these terminals 153 and 154 are respectively 1 and 0. At this time the output terminals 133 and 143 of the first-to-second and second-to-third signal generators 130 and 140 are 0, while the output terminals 134 and 144 are 1. The foregoing functions are shown in FIG. 5, where the ordinate represents the state of the signal at each of the output terminals, with the hill portions corresponding to 1 (output voltage is present) and the valley portions corresponding to 0 (output voltage is absent), and 1 ⇆ 2, 2 ⇆ 3 and 3 ⇆ 4 respectively denote first-to/from-second second-to/from-third and third-to/from-fourth shifting points.

Figure 5:
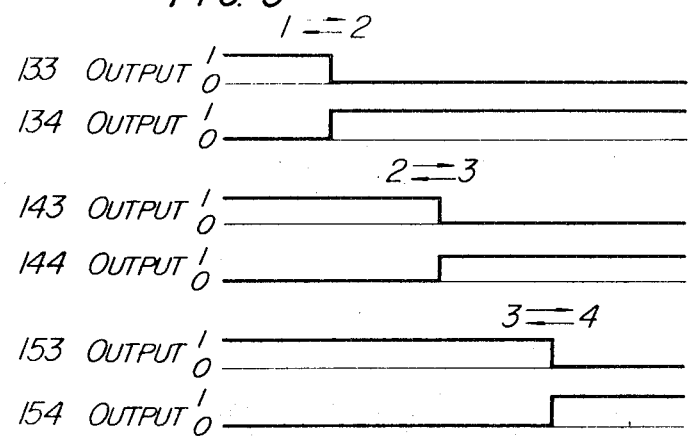
FIG. 5 shows outputs of three speed change signal generators in the system according to the invention.
Figure 6:
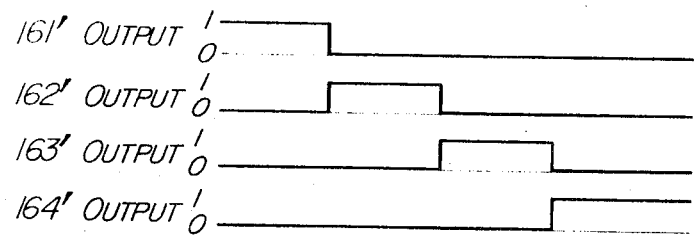
FIG. 6 shows outputs of a logic circuit in the system according to the invention.

When the signals of the waveforms of FIG. 5 are impressed upon the input terminals 161 to 166 of the logic circuit 160, outputs of the waveforms shown in FIG. 6 appear at the respective terminals 161', 162', 163' and 164'. When the power transmission is through the first speed gear, the output terminal 161' is 1, while the other terminals 162', 163' and 164' are 0. When the transmission is through the second speed gear, the output terminal 162' is 1, while the other output terminals 161', 163' and 164' are 0. When the transmission is through the third speed gear, the output terminal 163' is 1, while the other output terminals 161', 162' and 164' are 0. When the transmission is through the fourth speed gear, the output terminal 164' is 1, while the other output terminals 161', 162' and 163' are 0.

The memory 170 memorizes at what speed the automobile is travelling. When the driver releases the accelerator pedal, the signal (voltage) at the output terminal 21 of the throttle switch 20 disappears (corresponding to the "idling" state). As a result, the input signal becomes absent at the input terminal 179 of the memory 170 to cut off the signal, which has been impressed upon the terminals 171 to 174, and the memorized state prior to the cut-off continuously appears as the signal at the output terminals 175 to 178. Unless the throttle switch 20 is in the "idling" state, in case of the input terminal 171 being 1 and the other three input terminals 172, 173 and 174 being 0, constituting the first speed signal, the output terminals 175 and 177 are 0 and output terminals 176 and 178 are 1, in case of the input terminal 172 being 1 and the other three input terminals 171, 173 and 174 being 0, constituting the second speed signal, the output terminals 176 and 177 are 0 and the output terminals 175 and 178 are 1, in case of the input terminal 173 being 1 and the other three input terminals 171, 172 and 174 being 0, constituting the third speed signal, the output terminals 176 and 178 are 0 and the output terminals 175 and 177 are 1, and in case of the input terminal 174 being 1 and the other three input terminals 171, 172 and 173 being 0, constituting the fourth speed signal, the output terminals 175 and 178 are 0 and the output terminals 176 and 177 are 1. The foregoing is tabulated as follows:

State of the signal at the Input and Output Terminals of the Memory 170.

| Speed signal | Input Terminals 171, 172, 173 and 174 | Output Terminals | | | |
|---|---|---|---|---|---|
| | | 175 | 176 | 177 | 178 |
| First | 171 being 1 and the rest being 0 | 0 | 1 | 0 | 1 |
| Second | 172 being 1 and the rest being 0 | 1 | 0 | 0 | 1 |
| Third | 173 being 1 and the rest being 0 | 1 | 0 | 1 | 0 |
| Fourth | 174 being 1 and the rest being 0 | 0 | 1 | 1 | 0 |

Figure 7:
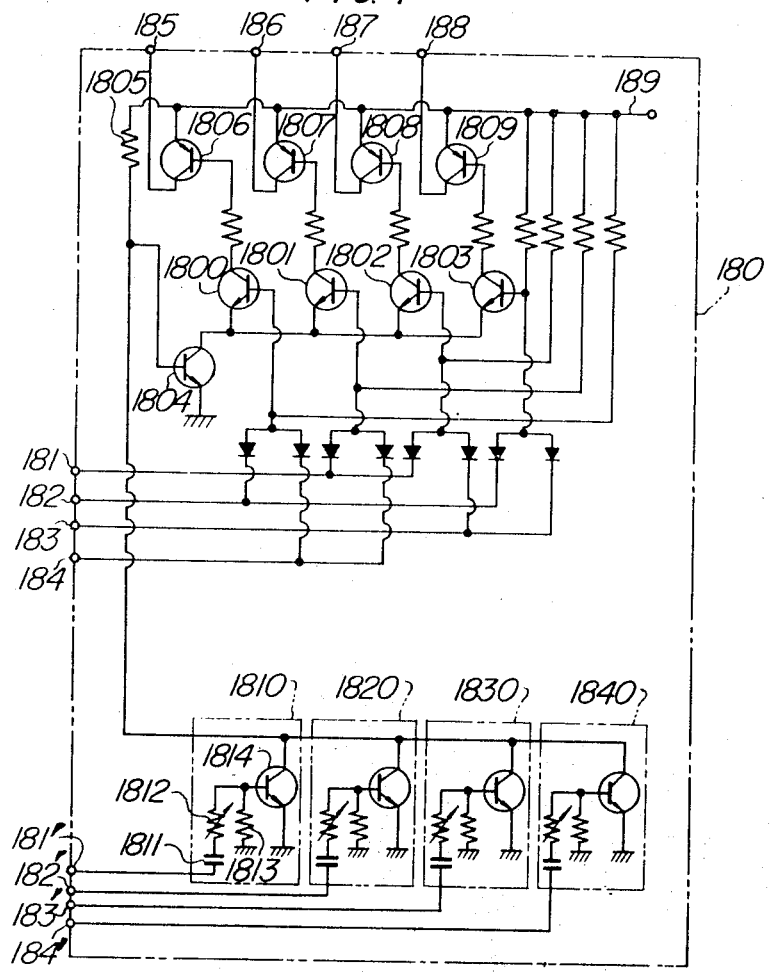
FIG. 7 is a circuit diagram of an embodiment of the electromagnetic drive circuit in the system according to the invention.

The electromagnetic valve drive circuit 180 has its input terminal 189 connected through the contacts of the selecter switch 30 to the power supply. Referring to FIG. 7, which is a circuit diagram of the electromagnetic valve drive circuit 180. It comprises an AND circuit, which includes transistors 1800, 1801, 1802 and 1803, and in which only the transistor 1800 is triggered on while the other three transistors are off if the input terminals 182 and 184 are 1 and the input terminals 181 and 183 are 0, only the transistor 1801 is triggered on while the other three transistors are off if the input terminals 181 and 184 are 1 and the input terminals 182 and 183 are 0, only the transistor 1802 is triggered on while the other three transistors are off if the input terminals 181 and 183 are 1 and the input terminals 182 and 184 are 0, and only the transistor 1803 is triggered on while the other three transistors are off if the input terminals 182 and 183 are 1 and the input terminals 181 and 184 are 0, and a power circuit, which includes timer circuits 1810, 1820, 1830 and 1840 having respective transistors, and in which there is base current in a transistor 1804 when the above transistors are all off to trigger the transistor 1804, whereupon if the transistors 1800 to 1803 are triggered, transistors 1806, 1807, 1808 and 1809 associated thereto are triggered to supply power to the output terminals 185 to 188. The timer circuits 1810, 1820, 1830 and 1840 are of the same circuit construction and arrangement. The input terminal 181', a capacitor 1811, a variable resistor 1812 and the base of a transistor 1814 of the timer circuit 1810 are connected in series in the mentioned order, a grounded resistor 1813 is connected to the base of the transistor 1814, and the emitter of the transistor 1814 is grounded. The output terminal of the timer circuit 1810 of the above construction, that is the collector of the transistor 1814, is connected to the base of the transistor 1804. Similarly, the output terminals of the other three timer circuits 1820, 1830 and 1840 are also connected to the base of the transistor 1804. The timer circuits 1820, 1830 and 1840 have the respective input terminals 182', 183' and 184'.

Figure 8:
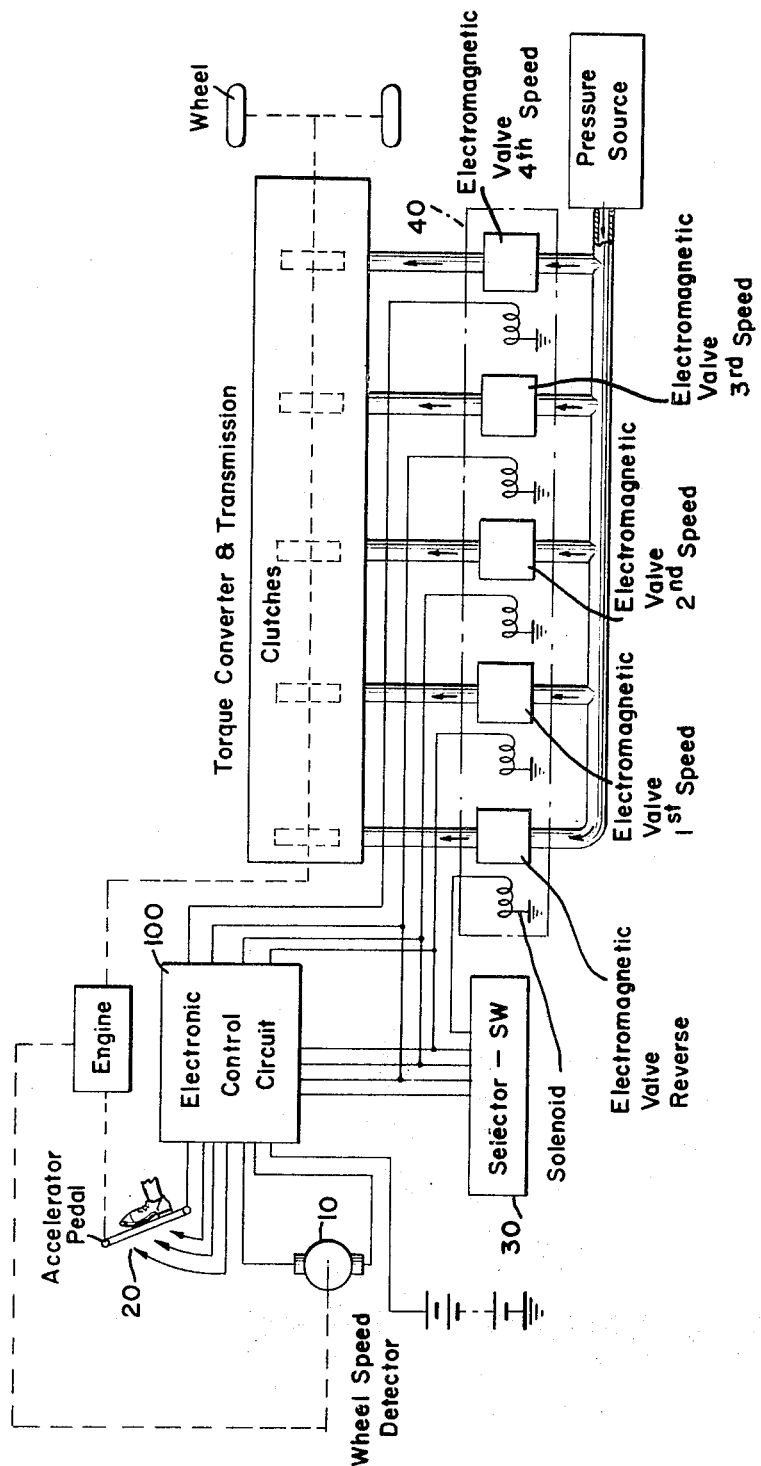
FIG. 8 is a diagrammatic illustration of the whole system.

When the signal as shown in FIG. 6 appears at one of the output terminals of the logic circuit 160, namely when the first speed signal appears at the output terminal 161', the memory 170 comes up with its output terminals 175 and 177 being 0 and 176 and 178 being 1, since the input terminal 171 is 1 and the other three input terminals 172 to 174 are 0. As a result, the transistor 1800 of the electromagnetic valve drive circuit 180 is triggered, triggering the transistor 1806 in the power circuit to supply power to the output terminal 185. Thus, as shown in FIG. 8, the solenoid of the first speed electromagnetic valve of the electromagnetic valve unit 40 is energized to open the first speed electromagnetic valve, which admits compressed air, thereby applying the first speed gear clutch to couple the first speed gear and the engine side gear through the fluid coupling.

When the relation between automobile speed and throttle opening goes to a point of actuating the first-to-second speed change signal generator 130 to produce the second speed signal at the output terminals of the logic circuit 160, namely place the output terminal 162' in 1 and the output terminals 161', 163' and 164' in 0, the memory 170 becomes to have the output terminals 176 and 177 being 0 and 175 and 178 being 1 to trigger the transistor 1801 of the electromagnetic valve drive circuit 180. However, since the input terminal 182' of the electromagnetic valve drive circuit 180 is also rendered 1 simultaneously with the output terminal 162' of the logic circuit 160, the conduction time of the transistor of the time circuit 1820 is limited to time $T_2$ determined by the time constant for the capacitor and variable resistor of the timer circuit 1820. Thus the transistor 1804 is cut off for the predetermined time interval $T_2$, during which the transistors 1801 and 1807 are off. Since the transistors 1806, 1808 and 1809 are off, all the electromagnetic valves of the electromagnetic unit 40 are closed, releasing all the gear clutches, so that the previously coupled gear of the multi-position shifting mechanism is uncoupled from the engine side gear to place the gears in neutral. When the afore-mentioned predetermined time $T_2$ has been passed, the transistor of the timer circuit 1820 is cut off to trigger the transistor 1804, thus triggering the transistor 1801 and the transistor 1807 of the power circuit so as to supply power to the output terminal 186. Thus, the solenoid of the second speed electromagnetic valve of the electromagnetic valve unit 40 is energized to open the second speed electromagnetic valve, thereby actuating the second speed gear clutch by the admitted air under high pressure to couple the second speed gear of the multi-position gear means and the engine side gear through the fluid coupling.

Similarly, when the third speed signal is sent out from the output terminal 163' of the logic circuit 160, the transistor 1802 of the electromagnetic valve drive circuit 180 is triggered, and simultaneously the timer circuit 183 is rendered operative for a predetermined time interval $T_3$ to uncouple the second speed gear from the engine side gear so as to place the gears in neutral for the time $T_3$, upon termination of which the third speed gear and the engine side gear coupled together through the fluid coupling. Also, when the fourth speed signal is sent out from the output terminal 164' of the logic circuit 160, the transistor 1803 of the electromagnetic valve drive circuit 180 is triggered, while at the same time the timer circuit 1840 becomes operative to de-mesh the third speed gear from the engine side gear so as to place the gears in neutral for a predetermined period of time $T_4$, at the end of which the fourth speed gear and the engine side gear is coupled together through the fluid coupling.

Conversely, when making the gear shift from the fourth into the third speeds, from the third into the second speeds and from the second into the first speeds, the gears are placed in neutral for the respective predetermined periods of time $T_3$, $T_2$ and $T_1$ before the respective change gears are brought into mesh with the engine side counterpart gear through the fluid coupling.

The ground for using four timer circuits 1810, 1820, 1830 and 1840 resides in that the r.p.m. on the engine side against the r.p.m. on the transmission side differs with the instant of gear shift from the first into the second, from the second into the third, from the third into the fourth and from the second into the first speed gears, so that it is necessary to change the neutral times $T_2$, $T_3$, $T_4$ and $T_1$ in order to accomplish the gear shift under an optimum condition.

The selecter switch 30 comprises five fixed contacts and a movable contact provided with a lever. By placing the lever in the "automatic" position, power is generated at the output terminal 31 to render the electromagnetic valve drive circuit operative. This is the state for the automatic gear shift. In case of the manual gear shift the lever is put into the "manual 1" position, thereby generating power at the output terminal 34 to energize the solenoid of the first speed electromagnetic valve of the electromagnetic valve unit 40, while by operating the lever into the "manual 2" position power is generated at the output terminal 33 to energize the solenoid of the second speed electromagnetic valve of the valve unit 40. Operation of the lever into the "manual R" position generates power at the output terminal 35 to actuate the solenoid of the reverse electromagnetic valve. In this manner, the shitting mechanism is placed in the required position.

What is claimed is:

1. A control system for an automatic transmission having a plurality of gear shift mechanism clutches and being usable in a vehicle having a movable accelerator, comprising
   a wheel speed detector for generating an output signal having a variable frequency proportional to the speed of said vehicle,
   an AC-DC converter operatively connected to said wheel speed detector for converting said output signal into corresponding magnitudes of DC voltage,
   a throttle switch adapted to cooperate with said accelerator and having a plurality of contacts successively operable in accordance with the amount of movement of said accelerator,
   a throttle circuit connected to said throttle switch for producing various values of output voltage in dependence upon the operation of said throttle switch contacts,
   a plurality of speed change signal generators each of which is connected to said converter and said throttle circuit for producing different speed change signals in accordance with respective predetermined transmission characteristics upon comparing the said DC voltage of said converter and the output voltage of said throttle circuit,
   a logic circuit connected to said speed change signal generators for producing an output in accordance with the state of speed,
   a memory connected to said logic circuit for memorizing the vehicle speed,
   means including an electromagnetic valve unit having a plurality of electromagnetic valves each with a respective solenoid for controlling a respective one of said gear shift mechanism clutches,
   and a drive circuit operatively connected to said solenoids, memory and logic circuit for causing any one but only one of the said solenoids to be operative at a time depending upon the said state of speed output and for preventing also the currently operating solenoid from operating only for a respective period of time, every time a speed change signal is produced from a corresponding one of said speed change signal generators to cause said transmission to be in neutral for that period of time.

2. A system according to claim 1, wherein said drive circuit comprises:
   a power circuit having outputs respectively connected to said solenoids of said electromagnetic valve unit and performing switching action of an electric power supply from a power source to said solenoids,
   an AND circuit connected between said power circuit and said memory to control the operation of said power circuit in response to input signals from said memory,
   a controlled switch means connected to complete an output circuit of said AND circuit,
   and timer circuits connected to receive speed change signals from said logic circuit and having its outputs connected to said controlled switch means, thereby to operate said controlled switch means for a constant period every time said speed change signal is received from said logic circuit.

3. A system according to claim 2, wherein said AND circuit comprises a plurality of transistors having a respective collector-emitter circuits and respective bases, respective resistors connecting said collector-emitter circuits to said power circuit, and a plurality of sets of two diodes, said diode sets respectively connecting said bases to different combinations of outputs of said memory.

4. A system according to claim 2, wherein said timer circuits comprise transistors having respective bases and respective resistor and capacitor sets connecting said bases to corresponding input terminals of said drive circuit to receive said logic circuit outputs, and wherein said controlled switch means comprises transistor having a base connected to the collector of each of said timer circuits and a collector connected to said power circuit.

5. A control system for an automatic transmission having a plurality of gear shift mechanism clutches and being usable in a vehicle having a movable accelerator, comprising
   a wheel speed detector for generating an output signal having a variable frequency proportional to the speed of said vehicle,
   an AC-DC converter operatively connected to said wheel speed detector for converting said output signal into corresponding magnitudes of DC voltage,
   a throttle switch adapted to cooperate with said accelerator and having a plurality of contacts successively operable in accordance with the amount of movement of said accelerator,
   a throttle circuit connected to said throttle switch for producing various values of output voltage in dependence upon the operation of said throttle switch contacts,
   a plurality of speed change signal generators each of which is connected to said converter and said throttle circuit for producing different speed change signals in accordance with respective predetermined transmission characteristics upon comparing the said DC voltage of said converter and the output voltage of said throttle circuit,
   means including an electromagnetic valve unit having a plurality of electromagnetic valves each with a respective solenoid for controlling a respective one of said gear shift mechanism clutches, and
   means including a drive circuit operatively connected between said speed change signal generators and solenoids for causing all of said solenoids to be operative but only one at a time in dependence upon the relative values of the signal generator outputs and for preventing operation of the currently operating solenoid for a respective period of time every time a speed change signal is produced from a corresponding one of said signal generators to cause said transmission to be in neutral for that period of time.

* * * * *